(12) United States Patent
Imamura (10) Patent No.: US 7,853,713 B2
(45) Date of Patent: Dec. 14, 2010

(54) COMMUNICATION INTERFACE DEVICE AND COMMUNICATION METHOD

(75) Inventor: Nobutaka Imamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 11/790,668

(22) Filed: Apr. 26, 2007

(65) Prior Publication Data

US 2007/0288646 A1   Dec. 13, 2007

(30) Foreign Application Priority Data

May 25, 2006   (JP)   ............................. 2006-145923

(51) Int. Cl.
    G06F 15/16   (2006.01)
(52) U.S. Cl. ..................... 709/237; 709/232; 712/225
(58) Field of Classification Search ................ 709/230, 709/232, 237, 250; 710/260; 712/225
    See application file for complete search history.

(56) References Cited

U.S. PATENT DOCUMENTS

| | | | | |
|---|---|---|---|---|
| 4,516,201 A | * | 5/1985 | Warren et al. ................ | 709/234 |
| 5,936,955 A | * | 8/1999 | Aimoto et al. ............... | 370/389 |
| 6,182,166 B1 | * | 1/2001 | Shklarsky et al. ............ | 710/33 |
| 6,748,423 B1 | * | 6/2004 | Khanna et al. ............... | 709/210 |
| 6,988,010 B2 | * | 1/2006 | Taniguchi et al. ............ | 700/65 |
| 7,076,636 B1 | * | 7/2006 | Chilton ....................... | 712/34 |
| 2005/0025139 A1 | * | 2/2005 | Brueckner et al. ........... | 370/362 |
| 2005/0267897 A1 | * | 12/2005 | D'Costa et al. .............. | 707/100 |

FOREIGN PATENT DOCUMENTS

| | | |
|---|---|---|
| JP | 05-324571 A | 12/1993 |
| JP | 06-301650 A | 10/1994 |
| JP | 07-200505 A | 8/1995 |
| JP | 2585338 | 11/1996 |
| JP | 09-083701 | 3/1997 |
| JP | 3495678 | 11/2003 |

OTHER PUBLICATIONS

JPO, Office Action mailed Jul. 6, 2010, by the Japan Patent Office, in connection with corresponding JP application No. 2006-145923. An English-language partial translation of the office action is enclosed.

* cited by examiner

*Primary Examiner*—Saleh Najjar
*Assistant Examiner*—Marie Georges Henry
(74) *Attorney, Agent, or Firm*—Fujitsu Patent Center (57) ABSTRACT

The communication I/F unit according to the present invention includes a chain executing unit that executes all the chain SWRs. The SWR-chain storage unit stores therein a chain of SWRs. The chain executing unit sequentially reads the SWRs and executes the corresponding operations of an atomic operation so that the corresponding packets are sent outside.

21 Claims, 5 Drawing Sheets

FIG.3

| ADDRESS | MEMORY CONTENT |
|---|---|
| ADDRESS 1 | POINTER OF LEADING STORAGE REGION FOR CHAIN SWRS |
| ADDRESS 2 | DATA STORAGE REGION |
| ... | ... |
| ADDRESS $X_1$ | POINTER FOR DATA STORAGE REGION SWR1<br>POINTER FOR STORAGE REGION OF NEXT SWR |
| ... | ... |
| ADDRESS $X_2$ | POINTER FOR DATA STORAGE REGION SWR2<br>POINTER FOR STORAGE REGION OF NEXT SWR |
| ... | ... |

CHAIN SWR STORAGE UNIT

DATA STORAGE UNIT

FIG.5

COMMUNICATION INTERFACE DEVICE AND COMMUNICATION METHOD

CROSS REFERENCE TO RELATED APPLICATIONS

This application is based on Japanese Application No. 2006-145923, filed on May 25, 2006, the disclosure of which is hereby incorporated herein by reference.

BACKGROUND OF THE INVENTION

1. Field of the Invention

The present invention relates to a communication interface device and a communication method for a computer arranged in a parallel computer architecture that, when receiving data from a sender computer.

2. Description of the Related Art

Data transmission and reception has been performed among a plurality of devices that are connected to each other. The device can be connected to other device in a tree structure or a mesh structure. In a tree structure, there is a demand to multicast communication data to a most-adjacent device, which is a device connected most adjacently to a device under consideration, and to transmit the data to the devices that are located beyond the most-adjacent device.

To meet this demand, conventional arts, such as Japanese Patent No. 2585338 and Japanese Patent Application Laid-open No. H9-83701, disclose multi-step relay multicasting methods for facsimile machines. In the disclosed technology, a facsimile machine that receives data from an upper-node facsimile machine transmits the data to a lower-node facsimile machine, which multicasts the data, from information about the lower-node facsimile machine.

In addition, Japanese Patent No. 3495678 discloses a data communication system that includes a sender computer and multiple receiver computers. In this system, the sender computer multicasts data to the receiver computers on the basis of the information that is stored in advance regarding the receiver computers as multicasting destinations. The data communication system also determines the transmission timing from the error information detected on the reception side to improve the reliability of the data multicasting communications.

In these years, a parallel computer architecture is becoming mainstream in place of a conventional large computer. In the parallel computer architecture, multiple computers are connected to one another in a communicable manner and they work cooperatively so that the architecture exhibits a capability of processing and computing enormous volumes of data.

There is a demand, also in the parallel computer architecture, to multicast communication data to most-adjacent computers and to transmit the data to computers that are located beyond the most-adjacent computers. In such processing, internode communications are employed to multicast data to the most adjacently connected computers and also to transmit it to the node computers that are located beyond the adjacently connected computers.

In the conventional technologies disclosed in Japanese Patent No. 2585338 and Japanese Patent Application Laid-open No. H9-83701 an interrupt is issued when data is received from an upper node, and another interrupt is issued when the data is forwarded to the following node computer. In other words, even the conventional technologies it is difficult to prevent interrupts from being successively issued.

The conventional technology described in Japanese Patent No. 3495678 aims at increasing the reliability in data multicasting communications. Thus, it is not meant to prevent interrupts from being successively issued.

SUMMARY OF THE INVENTION

It is an object of the present invention to at least partially solve the problems in the conventional technology.

According to an aspect of the present invention, a communication interface device in a first computer from among a plurality of computers in a parallel computer architecture that executes, upon receiving a packet from a transmitting computer, an operation associated with received packet includes a chain atomic command storage unit that stores therein chain atomic commands; a chain atomic command designating unit that conducts a memory operation on the basis of the packet received from the transmission computer and designates an atomic command associated with the packet received from the transmission computer from the chain atomic command storage unit; and a chain atomic command executing unit that executes designated atomic command, designates a chain atomic command associated with the atomic command from the chain atomic command storage unit, and executes designated chain atomic command.

According to another aspect of the present invention, a communication method to be executed on a first computer from among a plurality of computers in a parallel computer architecture of receiving a packet from a transmitting computer and executing an operation associated with received packet includes storing chain atomic commands in a chain atomic command storage unit; conducting a memory operation on the basis of the packet received from the transmission computer; first designating including designating an atomic command associated with the packet received from the transmission computer from the chain atomic command storage unit; and first executing the atomic command designated at the first designating; second designating a chain atomic command associated with the atomic command from the chain atomic command storage unit; and second executing the chain atomic command designated at the second designating.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a communication interface device and a communication method according to the present invention is explained in detail below with reference to the attached drawings.

According to the following embodiment, an example in which the present invention is applied to a chain of processes performed by a parallel computer architecture that includes computers connected to one another to execute parallel applications will be described. The parallel computers include cluster computers and grid computers. Moreover, it is assumed that Remote Direct Memory Access (RDMA), which is a technique of directly accessing a memory from a remote computer by use of interface standards for parallel computers, such as InfiniBand and Myrinet (trademarks), is employed.

Figure 1:
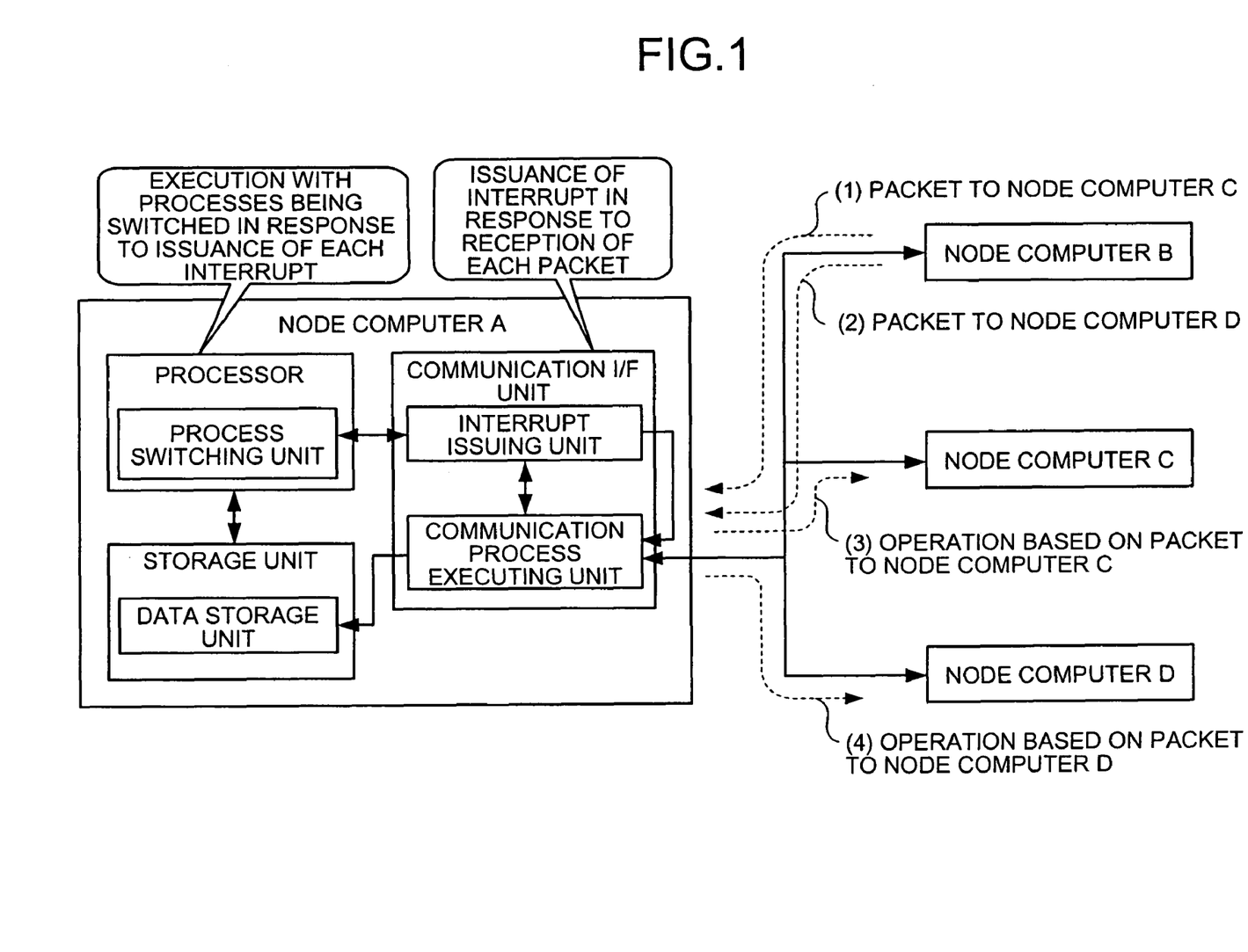
FIG. 1 is a diagram for explaining drawbacks of the conventional parallel computer architecture and its chain processing.

First, problems residing in conventional parallel computer architecture and a chain of processes performed thereby will be explained. FIG. 1 is a diagram for explaining the problems residing in the conventional parallel computer architecture and its synchronous processing. In the conventional parallel computer architecture in which node computers A, B, C, and D are connected as nodes to one another in a communicable manner, a problem arises in chain packet transmission where a message communication packet is sent from the node computer B via the node computer A to the node computer C, and another message communication packet is sent from the node computer C via the node computer A to the node computer D.

A packet includes a command requesting via a network that a remote computer execute an atomic operation or the like that corresponds to the packet and data to be subjected to the atomic operation. Any interrupt is prohibited until the execution of the atomic operation is completed, and thus no other operation is allowed during the atomic operation.

Each of the node computers A, B, C, and D is provided with a processor, a storage unit, and a communication I/F unit. The processor can be a central processing (CPU), the storage unit can be a memory, and the communication I/F unit can be a network interface card. The processor includes a process switching unit. The storage unit includes a data storage unit, which is a write region to write data in, including received data. The communication I/F unit includes a communication process executing unit that executes an atomic operation and the like, and an interrupt issuing unit.

Each time an interrupt is issued by the interrupt issuing unit, or each time an event occurs, the process switching unit carries out a process of switching to a process corresponding to each data received from any of the node computers each time of data reception.

When receiving a packet from a node computer, the communication process executing unit executes a communication process such as an atomic operation corresponding to the packet to conduct a memory operation directly onto the data storage unit. Furthermore, the communication process executing unit outputs a command to the interrupt issuing unit so that an interrupt is issued to the processor in relation to the data reception.

On the basis of the interrupt issuing command received from the communication process executing unit, the interrupt issuing unit causes the processor to issue an interrupt. Furthermore, in response to a Send Work Request (SWR), which is an external packet transmission command that is output by the processor, the interrupt issuing unit outputs a packet transmission command to the communication process executing unit. Then, in response to the packet transmission command received from the interrupt issuing unit to send a packet to another node computer, a suitable packet is sent to the node computer.

In the following situation, data is transmitted from the node computer B via the node computer A to the node computers C and D. First, (1) when the node computer A receives a packet in relation to a chain of operations from the node computer B, message reception is executed in response to the reception of this packet. For this reception, an interrupt and process switching are issued to the processor. Due to the process that has been switched, (2) a packet in relation to the chain of operations is transmitted to the node computer C. During (1) and (2), interrupts and process switching are issued to the node computer A to receive and transmit the packets, which disturbs the context switch. As a result, an overhead is created in the node computer A.

Next, (3) when the node computer A receives the packet in relation to the chain of operations from the node computer C, message reception is executed in response to the reception of this packet. For this reception, an interrupt and process switching are issued to the processor. Thereafter, due to the process that has been switched, (4) a packet in relation to the chain of operations is transmitted to the node computer D. In a similar manner to the above, during (3) and (4), interrupts and process switching are issued to the node computer A to receive and transmit the packets, which disturbs the context switch. As a result, an overhead is created in the node computer A.

As discussed above, the conventional parallel computer architecture issues an interrupt to the processors each time a packet for a chain of operations is received. The process switching unit switches processes each time an interrupt is issued, to send a command for an operation indicated by the received data. The issuance of interrupts and process switching significantly disturbs the context switch of the processors.

Furthermore, if the conventional technology is applied as it is to a packet-reception-based atomic operation via a network, exclusive access control needs to be incorporated, where a spin lock is adopted to perform retries until the lock of the reception side is acquired on the transmission side. This busy waiting during the retries incurs process switching in the processor of the transmission side, which may significantly disturb the context switch.

For these reasons, when a distributed application is run by parallel computers, it is difficult for the entire parallel computer architecture to achieve a high processing capacity in communications among the computers, no matter how high processing capacity each individual computer exhibits, because interrupts are frequently issued with respect to a synchronous process and also because the process switching increases the frequency of context switching.

Focusing attention on the features of the distributed application for message communications, the embodiments have been conceived to provide a communication interface device and a communication method that, in running an application for executing chain operations indicated by a received message every time of the message reception, reduces overhead that could appear in association with communications among the computers when, for instance, an interrupt is issued to the processor every time a message arrives to perform a synchronous process at the processor, thereby improving the processing capacity of the entire parallel computer architecture.

Figure 2:
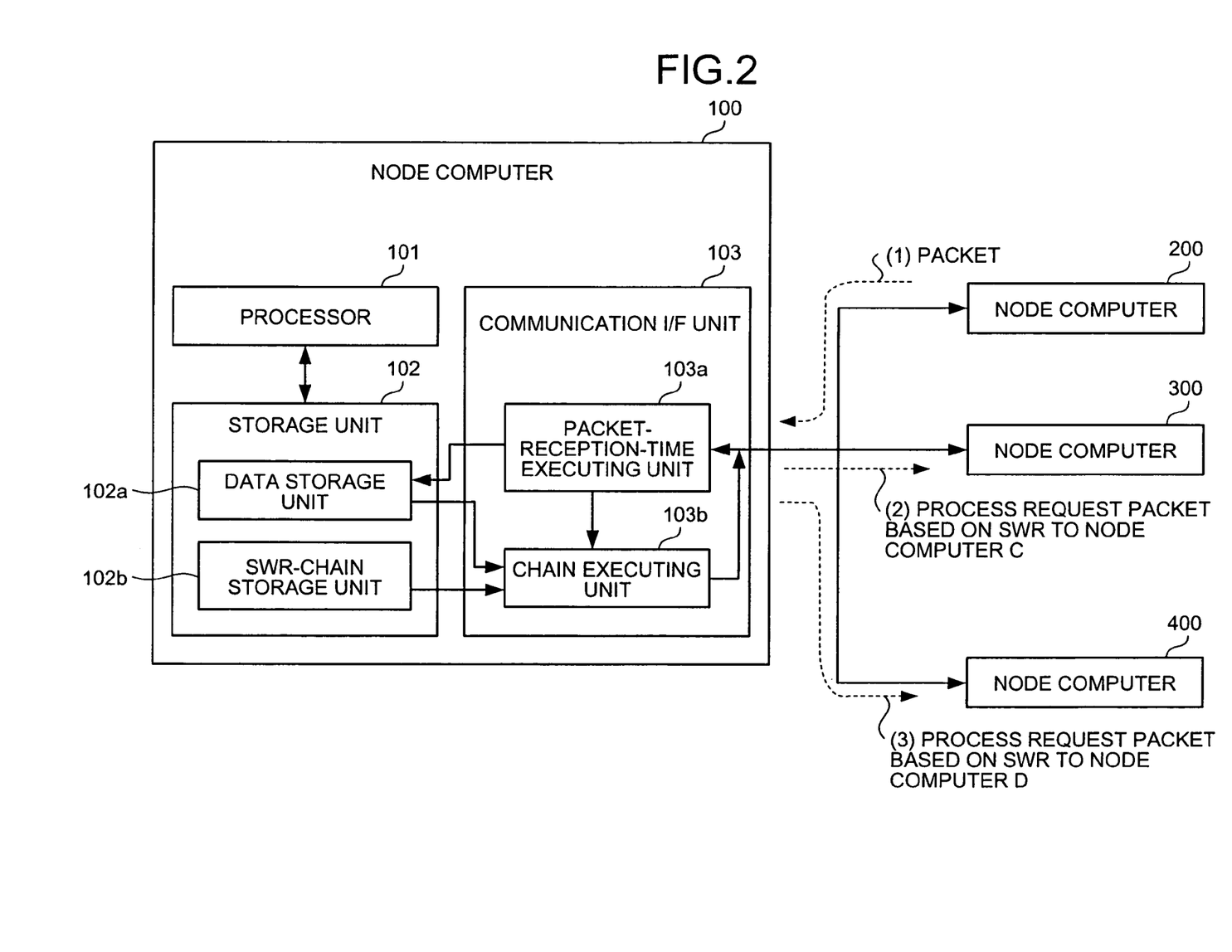
FIG. 2 is a functional block diagram of a parallel computer architecture according to an embodiment.

Next, a parallel computer architecture according to an embodiment of the present invention will be explained. FIG. 2 is a functional block diagram of a parallel computer architecture according to the embodiment. The parallel computer architecture includes node computers 100 to 400. The node computers 100 to 400 have the same functions and same configuration; therefore, the functions and configuration of the node computer 100 is explained below as a representative example.

The node computer 100 includes a processor 101 such as a CPU, a storage unit 102 such as a memory, and a communication I/F unit 103, which is a network interface card. The processor 101 does not include a process switching unit. The storage unit 102 includes a data storage unit 102a, which is a write region for data including received data, and an SWR-chain storage unit 102b, which stores therein a chain of SWRs. The communication I/F unit 103 includes a packet-reception-time executing unit 103a and a chain executing unit 103b.

Each packet that is transmitted and received according to the embodiment includes data that is to be subjected to the corresponding atomic operation, and also pointer information that indicates addresses of SWRs stored in the SWR-chain storage unit 102b to be executed in sequence. The data storage unit 102a stores data that is subjected to the atomic operation in response to the SWRs, and also pointer information that indicates the leading storage address of the SWRs stored in the SWR-chain storage unit 102b to be executed in sequence.

Upon receiving an SWR, the packet-reception-time executing unit 103a conducts a memory operation at the data storage unit 102a in correspondence with the SWR, and sends a command to the chain executing unit 103b to execute chain atomic operations.

The chain executing unit 103b, when receiving the command from the packet-reception-time executing unit 103a to execute the chain atomic operations, first reads the pointer information indicating the leading storage address of the SWRs that are to be executed in sequence, from the data storage unit 102a. Then, the chain executing unit 103b reads out the first SWR stored at the address indicated by the pointer and executes an atomic operation corresponding to the first SWR. Next, the chain executing unit 103b reads the second SWR by referring to the pointer indicating the storage address of the second SWR that is to be executed next as a sequel to the first SWR, where the storage address of the second SWR is stored in the SWR-chain storage unit 102b in association with the first SWR, and executes an atomic operation corresponding to the second SWR. As long as there is pointer information stored to indicate the storage address of an SWR that is to be executed next, this operation is repeated. In this manner, once an SWR is received from the outside, the communication I/F unit 103 functions so that the chain of SWRs are read out one after another, thereby executing the corresponding operations included in the atomic operation.

Let us look into the structure more precisely, with reference to FIG. 2. (1) When the node computer 100 receives a packet associated with chain operations from the node computer 200, the operations included in the atomic operation corresponding to a chain of SWRs are sequentially executed in response, and as a result, packets are sent out. More specifically, (2) a request-process packet is sent to the node computer 300 on the basis of an SWR in the chain, and then (3) a request-process packet is sent to the node computer 400 on the basis of the next SWR.

In the conventional technology, when data is to be transmitted from the node computer 200 via the node computer 100 to the node computer 300 and the node computer 400, a packet needs to be transmitted to the node computer 100 each time data is sent to the node computer 300 or to the node computer 400. Such communications between the nodes cause interrupts to be issued, and the process switching disturbs the context switching. The internode communications therefore have created a bottleneck in improving the performance of the entire parallel computer architecture.

According to the embodiment, however, when data is to be transmitted from the node computer 200 via the node computer 100 to the node computer 300 and the node computer 400, if data needs to be sent to both of the node computer 300 and the node computer 400, all that is necessary is a single transmission of a packet from the node computer 200 to the node computer 100. The communication I/F unit 103 serves to transmit data to the node computer 300 and the node computer 400 on the basis of a chain of SWRs to sequentially run the atomic operation. The packet is passed down in this manner, thereby offloading the processor. This prevents the internode communications from leading to the issuance of interrupts and the process switching from disturbing the context switching. Hence, the performance of the entire parallel computer architecture is improved.

Figure 3:
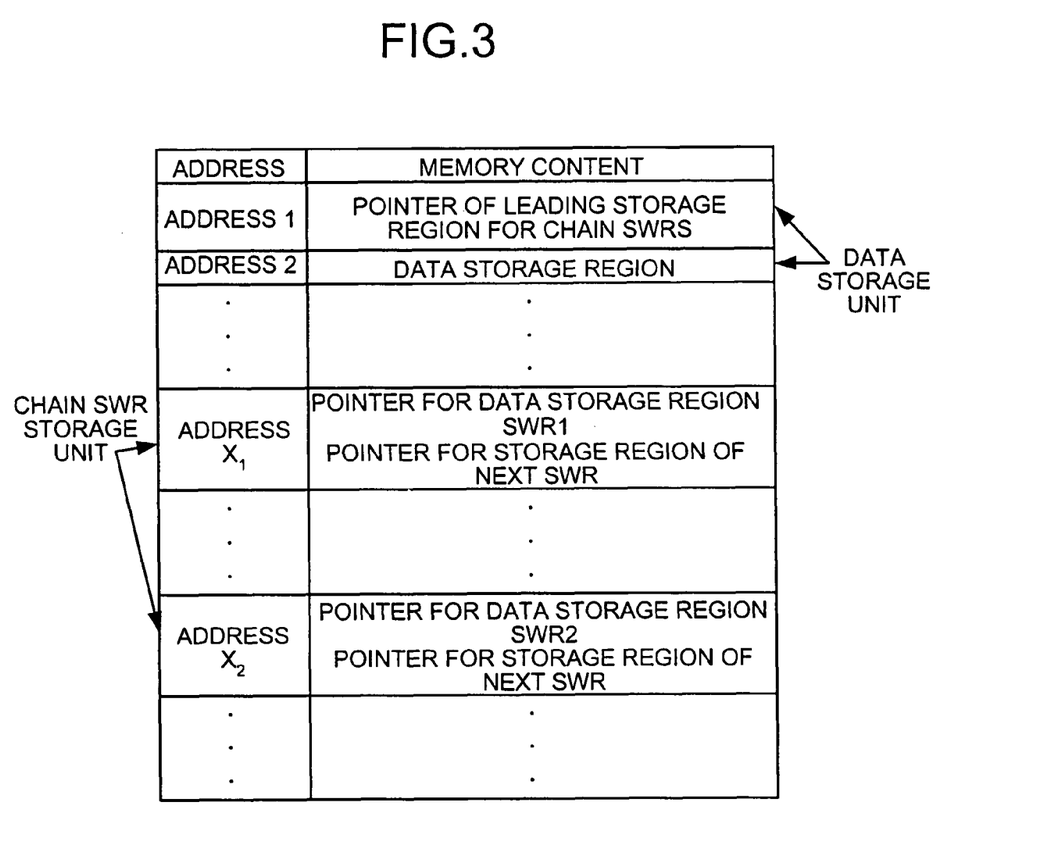
FIG. 3 is a diagram for explaining the contents of a storage unit shown in FIG. 2.

Next, the memory content of the storage unit of a node computer will be explained. FIG. 3 is a diagram for explaining contents of the storage unit 102. The storage unit 102 stores a pointer of the leading storage region for a chain of SWRs at address 1. More specifically, this pointer indicates information at address $X_1$, which will be discussed later. Data associated with the SWRs is stored at address 2. The memory regions designated by the addresses 1 and 2 are referred to as the data storage unit 102a.

The storage unit 102 stores, at address $X_1$, a pointer for the data storage region (which is address 2), the SWR 1 contained in the chain of SWRs, and a pointer for the storage region of the following SWR (which is address $X_2$). Similarly, at address $X_2$, the storage unit 102 stores the pointer for the data storage region (which is address 2), the SWR 2 contained in the chain of SWRs, and a pointer for the storage region of the following SWR. In other words, each SWR contained in the chain is stored in connection with a pointer indicating the storage region of the following SWR that is to be read out next so that the corresponding operation of the atomic operation is executed. The memory regions designated by the addresses $X_1$, $X_2$, and so forth are referred to as the SWR-chain storage unit 102b.

The packet-reception-time executing unit 103a receives SWRs associated with chain operations not only from other node computers but also from the node computer of its own. This is because the packet-reception-time executing unit 103a is enabled to transmit an SWR to the node computer of its own.

Because the address of the memory region for which the operation is specified by the SWR is a virtual address, the communication I/F unit 103 is provided with a function of converting such a virtual address to a real address. In addition, the chain executing unit 103b sends, on the basis of a command of transmitting a packet to another node computer, the corresponding SWR to this node computer.

Figure 4:
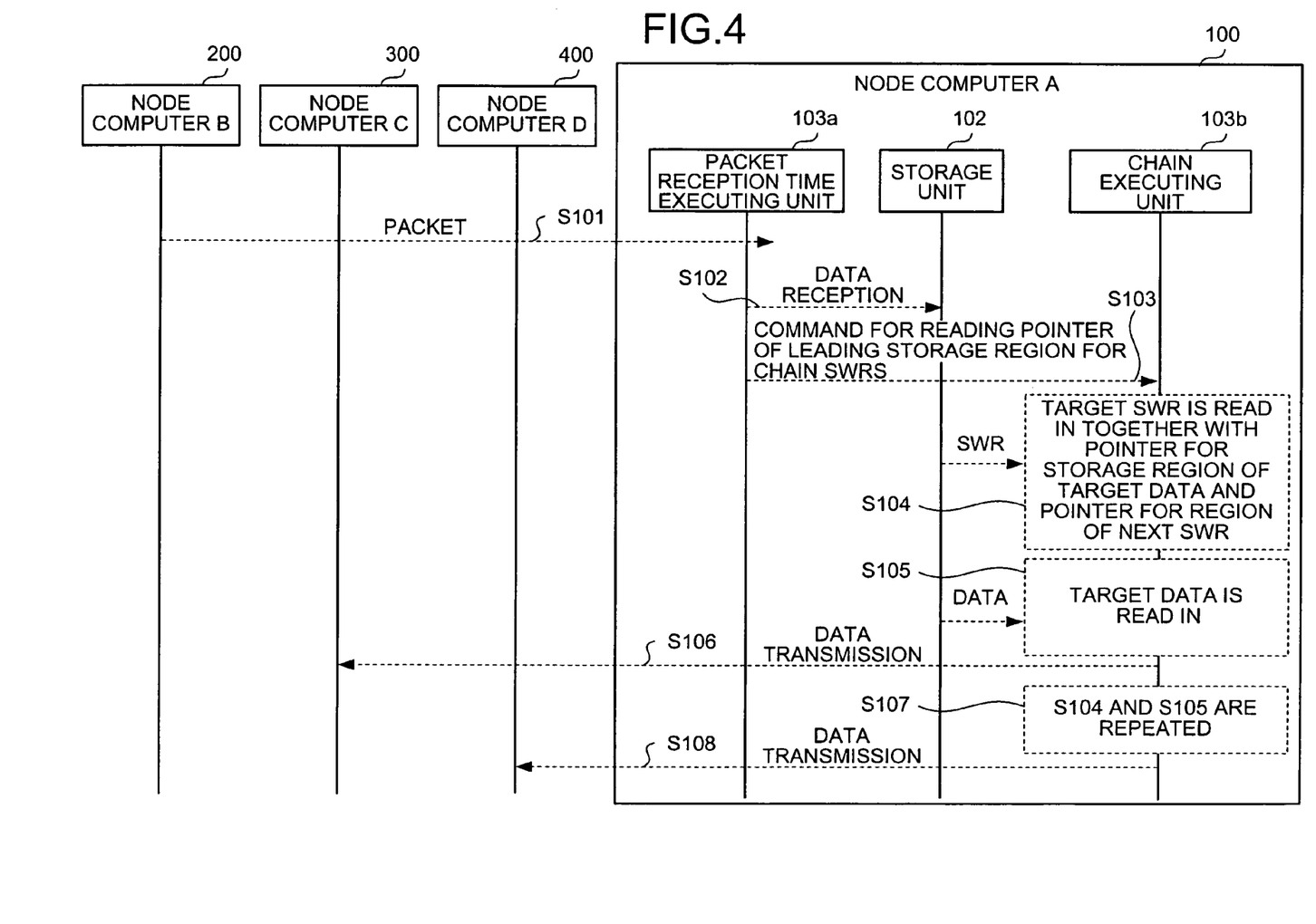
FIG. 4 is a sequence diagram of a chain process.

Next, the chain operations performed by the parallel computer architecture illustrated in FIG. 2 will be explained. FIG. 4 is a sequence diagram of the chain operations performed by the parallel computer architecture illustrated in FIG. 2. First, a packet is sent from the node computer 200 to the packet-reception-time executing unit 103a of the node computer 100, and the packet-reception-time executing unit 103a receives the packet (step S101).

Then, a memory operation is executed onto the storage unit 102 by the packet-reception-time executing unit 103a on the basis of the packet received from the node computer 200 (step S102). Further, a command is output to the sequence executing unit 103b to read the pointer of the leading storage region for the chain of SWRs (step S103). Thereafter, the target SWR is read from the storage unit 102 together with the pointer for the storage region of the target data and the pointer for the storage region of the following packet, and output to the chain executing unit 103b (step S104).

Next, the chain executing unit 103b reads the target data from the data storage unit 102a (step S105). Then, the node computer 100 sends a packet to the node computer 300 in response to the SWR, where the packet is received (step S106).

The steps S104 and S105 are repeated so that the SWRs are sequentially read out to execute the corresponding operations of the atomic operation (step S107). Then, a packet is sent from the node computer 100 to the node computer 400 in response to an SWR of the chain, where the packet is received (step S108). It should be noted that the operations similar to the steps S104, S105, and S108 are repeated so long as SWRs are stored in the SWR-chain storage unit 102b as a chain.

According to the conventional technology, when a packet associated with chain operations is received from a node computer, an interrupt or an event is issued to the processor every time of the execution of an operation. According to the embodiment, however, the communication I/F unit 103 of the node computer performs, in place of the processor, the entire process of transmitting a chain-operation-associated packet on the basis of SWRs. Thus, the context switch of the processor is prevented from being disturbed by an interrupt or an event, and the performance of the entire parallel computer architecture is kept from dropping.

Figure 5:
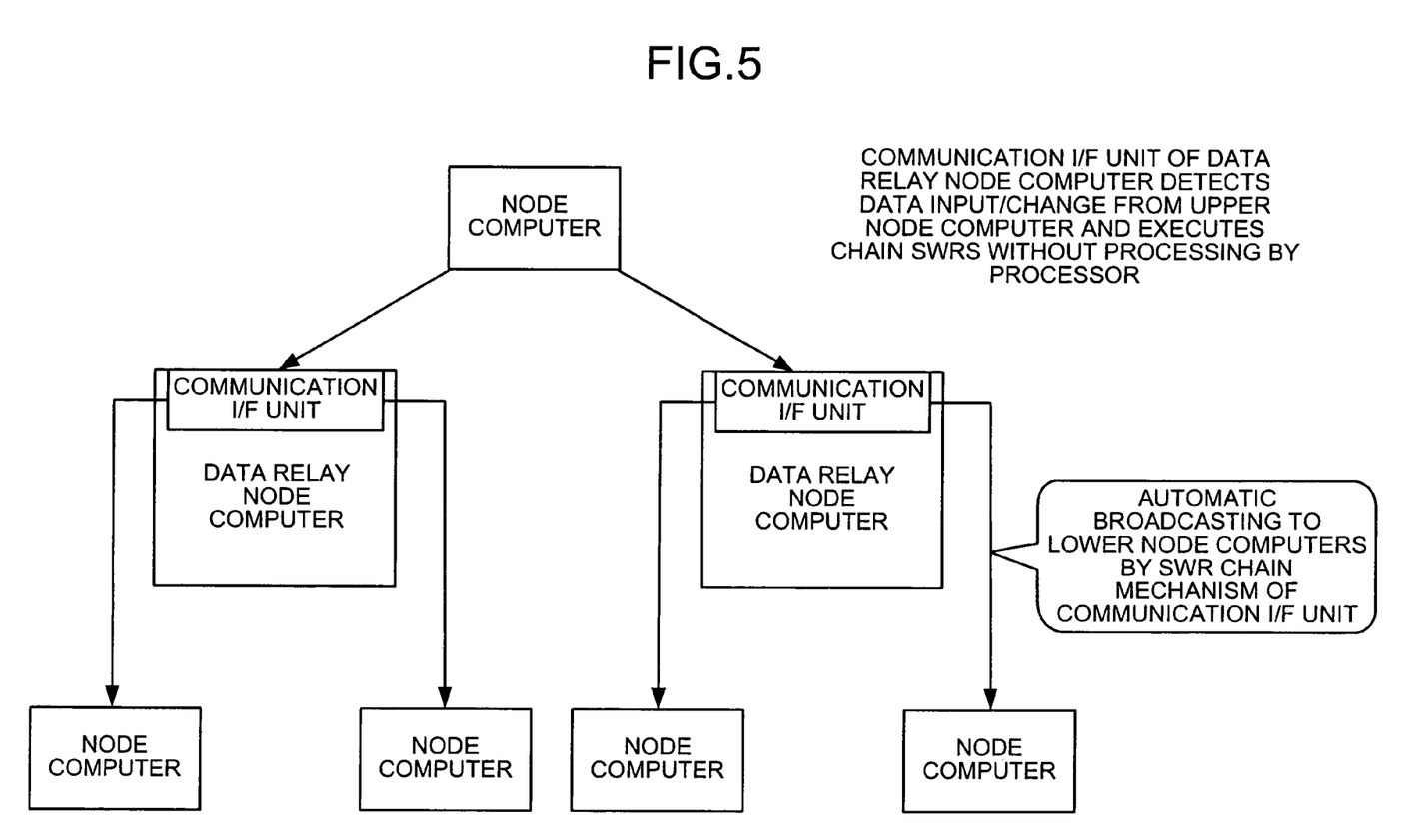
FIG. 5 is a diagram for explaining an application of the embodiment.

Next, an application of the embodiment will be explained. FIG. 5 is a diagram of an application of a parallel computer architecture according to the embodiment in which computers each including the communication I/F unit 103 as illustrated in FIG. 2 are connected to one another. When the data is transmitted sequentially from an upper node computer via data relay node computers to lower node computers, the communication I/F unit of each of the data relay node computers detects data that has been input or changed by the upper node computer. The data relay node computers execute, without any processing by the processor, a chain of SWRs to relay data. Data broadcasting in which the processor of the data relay node computer is offloaded can be thereby realized.

The present invention is not limited to this embodiment. The present invention may be carried out in various embodiments within a scope of technical idea specified in the claims. Other embodiments will be explained below.

According to the embodiment, communications in chain are assumed to be of a fan-in/out type in which data is transmitted from one sender node computer to one receiver node computer. However, the present invention is not limited thereto. The communication I/F unit 103 may be provided with a chain atomic operation execution determining unit to compare the atomic operation execution starting condition that is stored in the storage unit 102 with the value of the memory stored in the data storage unit 102a after the memory operation executed in association with the atomic operation, in response to the atomic operation execution notification from the packet-reception-time executing unit 103a. When the atomic operation execution determining unit determines that the two values coincide with each other, a command for reading a chain of SWRs and executing an atomic operation corresponding thereto may be output to the chain executing unit 103b. In this manner, chain communications of a fan-in/out type can be realized in which chain operations start while carrying out a synchronizing and waiting process when there is more than one input.

The chain atomic operation execution starting condition is configured to be a target value for the final value stored in the data storage unit 102a. The present invention is limited thereto, however. The atomic operation execution starting condition may be configured to be the number of times of receiving data necessary for the synchronizing process. The data storage unit 102a keeps count of data reception, and when the count reaches a predetermined value, the atomic operation may start to run.

The packet-reception-time executing unit 103a may be provided with a function of turning a flag on when a packet associated with chain operations is received and keeping it on during the operations while initializing the flag when the chain operations are completed. In such a configuration, the packet-reception-time executing unit 103a may be further provided with a function of, when another packet is received before the flag initialization, ignoring this packet and sending the sender node computer a command for retrying the packet transmission. In this manner, exclusive access control can be realized with which no new packet can be received during the chain operations.

The communication I/F unit 103 may be further provided with a chain atomic command execution completion determining unit to determine whether all the SWRs in a chain stored in the SWR-chain storage unit 102b are read out by the chain executing unit 103b and the corresponding operations in an atomic operation are executed to transmit packets. The communication I/F unit 103 may also be provided with an interrupt issuing unit to issue an interrupt to the processor of the node computer, when the chain atomic command execution completion determining unit determines that all the SWRs of the chain stored in the SWR-chain storage unit 102b are read out and the corresponding operations are executed to transmit the packets, so that the processing of the received data can start running.

In addition, the communication I/F unit 103 may be provided with a completion notification transmitting unit to transmit a completion notification to the processor of the node computer so that the processing of the received data starts running when the atomic command execution completion determining unit determines that all the SWRs of the chain stored in the SWR-chain storage unit 102b are read out and the corresponding operations are executed.

The communication I/F unit 103 may also be provided with a communication process executing unit to execute a predetermined communication process with respect to the sender node computer when the atomic command execution completion determining unit determines that all the SWRs of the chain stored in the SWR-chain storage unit 102b are read out and the corresponding operations are executed.

The packet-reception-time executing unit 103a may be configured to conduct a memory operation in response to the reception of a packet from the node computer having the communication I/F unit 103, and also to designate an SWR associated with the received data, with reference to the data storage unit 102a.

The embodiments of the present invention have been explained above; however, the present invention should not be limited thereto. It may be carried out with suitable modifications to the design without departing from the scope of the technical idea specified in the claim. The effects of the embodiments are also not limited to what is discussed here.

For convenience of explanation, four node computers are connected to one another in the parallel computer architecture according to the embodiments. The present invention is equally applicable to the architecture with two or three node computers, or more than five node computers.

Furthermore, the communication I/F unit 103 is compatible with a conventional communication I/F unit as a communication mechanism. Thus, a node computer incorporating a communication I/F unit 103 according to the present invention may be connected to a node computer without one. In such architecture, interrupts are issued to the processor of the node computer without a communication I/F unit 103 according to the present invention during the inter-node communications, disturbing the context switching for the chain operations and lowering the communication performance. In other words, the parallel computer architecture may include both a node computer incorporating a communication I/F unit 103 according to the present invention and a node computer without a communication I/F unit 103 according to the present invention.

According to an aspect of the present invention, the processing load on the processors of the computers are more effectively reduced and the processing capability of the parallel computers is less lowered than in an architecture where atomic commands are executed each time a packet is received.

Moreover, the processing load on the processors of the computers can be effectively reduced, increasing the processing capability of the parallel computer architecture.

Furthermore, the processing capacity of the parallel computer architecture can be improved.

Moreover, the computer transmits the packet can be notified that the memory operation is completed with its result satisfying the predetermined condition.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication interface device in a first computer from among a plurality of computers in a parallel computer architecture that executes, upon receiving a packet from a transmitting computer, an operation associated with received packet, the communication interface device comprising:
    a chain atomic command storage unit that stores therein a plurality of atomic commands to transmit a communication packet, each of the atomic commands being chained using an address that indicates a next chained atomic command;
    a chain atomic command designating unit that conducts a memory operation in a memory of the first computer on the basis of the packet received from the transmission computer and designates, from among the atomic commands stored in the chain atomic command storage unit, an atomic command by a pointer included in the packet received from the transmission computer; and
    a chain atomic command executing unit that executes the designated atomic command, designates an atomic command chained with the designated atomic command among the atomic commands stored in the chain atomic command storage unit, and executes the chained atomic command.

2. The communication interface device according to claim 1, wherein the chain atomic command designating unit conducts a memory operation in response to a packet transmitted by the first computer and designates, from among the atomic commands stored in the chain atomic command storage unit, an atomic command by a pointer included in the packet transmitted by the first computer.

3. The communication interface device according to claim 1, further comprising an interrupt issuance condition determining unit that determines, every time a packet is received owing to the atomic command executed in association with a synchronous process by the chain atomic command executing unit of each of a plurality of transmitting computers, whether a result of the memory operation conducted on the atomic command meets a predetermined condition, wherein
    when the interrupt issuance condition determining unit determines that a result of the memory operation meets the predetermined condition, the chain atomic command designating unit designates an atomic command by a pointer included in the received packet.

4. The communication interface device according to claim 1, further comprising a chain atomic command execution completion determining unit that determines whether all the chained atomic commands stored in the chain atomic command storage unit are executed by the chain atomic command executing unit.

5. The communication interface device according to claim 4, further comprising an interrupt issuing unit that, when the chain atomic command execution completion determining unit determines that all the chained atomic commands stored in the chain atomic command storage unit are executed, issues an interrupt to a processor of the first computer so that the processor starts processing of the received packet.

6. The communication interface device according to claim 4, further comprising a completion notification transmitting unit that, when the chain atomic command execution completion determining unit determines that all the chained atomic commands stored in the chain atomic command storage unit are executed, transmits a completion notification to the transmitting computer.

7. The communication interface device according to claim 4, further comprising a communication process executing unit that, when the chain atomic command execution completion determining unit determines that all the chained atomic commands stored in the chain atomic command storage unit are executed, executes a predetermined communication process onto the transmitting computer.

8. The communication interface device according to claim 4, further comprising:
    a packet reception information storage unit that stores therein packet reception information that indicates that the packet is received from the transmitting computer; and
    a packet reception information initializing unit that initializes the packet reception information in the packet reception information storage unit when the chain atomic command execution completion determining unit determines that all the chained atomic commands stored in the chain atomic command storage unit are executed.

9. The communication interface device according to claim 8, further comprising:
    a chain atomic command designation aborting unit that, when another packet is received from the transmitting computer before the packet reception information initializing unit initializes the packet reception information, aborts the memory operation and designation of the atomic command performed by the chain atomic command designating unit; and
    an atomic command aborting information transmitting unit that transmits information to the transmitting computer that indicates the designation of the atomic command being aborted by the chain atomic command designation aborting unit.

10. The communication interface device according to claim 9, further comprising a packet transmission retrying unit that retries packet transmission to the first computer when the information transmitted by the atomic command aborting information transmitting unit that indicates the designation of the atomic command being aborted is received from the first computer.

11. A communication method, to be executed on a first computer from among a plurality of computers in a parallel computer architecture, of receiving a packet from a transmitting computer and executing an operation associated with received packet, the communication method comprising:
  storing a plurality of atomic commands to transmit a communication packet, each of the atomic commands being chained using an address that indicates a next chained atomic command in a chain atomic command storage unit;
  conducting a memory operation in a memory of the first computer on the basis of the packet received from the transmission computer;
  first designating including designating, from among the atomic commands stored in the chain atomic command storage unit, an atomic command by a pointer included in the packet received from the transmission computer;
  first executing the atomic command designated at the first designating;
  second designating an atomic command chained with the designated atomic command among the atomic commands stored in the chain atomic command storage unit; and
  second executing the chained atomic command designated at the second designating.

12. A communication method according to claim 11, further comprising third designating an atomic command associated with the atomic command executed at the second executing from the chain atomic command storage unit and executing the atomic command designated at the third designating.

13. The communication method according to claim 11, wherein
  the conducting includes conducting a memory operation in response to a packet transmitted by the first computer, and
  the first designating includes designating, from among the atomic commands stored in the chain atomic command storage unit, the atomic command by a pointer included in the packet transmitted by the first computer.

14. The communication method according to claim 11, further comprising determining, every time a packet is received owing to the atomic command executed in association with a synchronous process at the second executing of each of a plurality of transmitting computers, whether a result of the memory operation conducted on the atomic command meets a predetermined condition, wherein
  when it is determined at the determining that a result of the memory operation meets the predetermined condition, the first designating includes designating an atomic command associated by a pointer included in the received packet.

15. The communication method according to claim 11, further comprising determining whether all the chained atomic commands stored in the chain atomic command storage unit are executed at the second executing.

16. The communication method according to claim 15, further comprising issuing, when it is determined at the determining that all the chained atomic commands stored in the chain atomic command storage unit are executed, an interrupt to a processor of the first computer so that the processor starts processing of the received packet.

17. The communication method according to claim 15, further comprising transmitting, it is determined at the determining that all the chained atomic commands stored in the chain atomic command storage unit are executed, a completion notification to the transmitting computer.

18. The communication method according to claim 15, further comprising third executing including executing, when it is determined at the determining that all the chained atomic commands stored in the chain atomic command storage unit are executed, a predetermined communication process onto the transmitting computer.

19. The communication method according to claim 15, further comprising:
  storing packet reception information that indicates that the packet is received from the transmitting computer in a packet reception information storage unit; and
  initializing the packet reception information in the packet reception information storage unit when it is determined at the determining that all the chained atomic commands stored in the chain atomic command storage unit are executed.

20. The communication method according to claim 19, further comprising:
  aborting, when another packet is received from the transmitting computer before the packet reception information is initialized at the initializing, the conducting and the first designating; and
  transmitting information to the transmitting computer that indicates the first designating has been aborted at the aborting.

21. The communication method according to claim 20, further comprising retrying packet transmission to the first computer when the information transmitted at the transmitting that indicates the first designating being aborted is received from the first computer.

* * * * *